(12) United States Patent
Moon et al.

(10) Patent No.: US 9,173,179 B2
(45) Date of Patent: Oct. 27, 2015

(54) SYNCHRONIZATION METHOD AND APPARATUS FOR BROADCAST MULTICAST SERVICE

(71) Applicant: Electronics and Telecommunications Research Institute, Daejeon (KR)

(72) Inventors: Jung Mo Moon, Daejeon (KR); Woo Goo Park, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 106 days.

(21) Appl. No.: 13/735,257

(22) Filed: Jan. 7, 2013

(65) Prior Publication Data

US 2013/0258933 A1 Oct. 3, 2013

(30) Foreign Application Priority Data

Mar. 28, 2012 (KR) ........................ 10-2012-0031520

(51) Int. Cl.
*H04J 3/06* (2006.01)
*H04W 56/00* (2009.01)
*H04W 4/06* (2009.01)

(52) U.S. Cl.
CPC ................ *H04W 56/00* (2013.01); *H04W 4/06* (2013.01)

(58) Field of Classification Search
CPC ....... H04N 21/20; H04N 20/71; H04N 5/445; H04W 4/06; H04W 36/00; H04W 56/00; H04W 40/00; H04W 48/08; H04H 20/71; H04L 12/66; G06F 15/16; H04Q 7/22; H04B 7/005
USPC ......... 370/252, 312, 350, 352, 328, 329, 335, 370/338; 455/436, 525, 507, 515, 466, 458; 725/39, 88; 709/219, 227
See application file for complete search history.

(56) References Cited

U.S. PATENT DOCUMENTS

| | | | |
|---|---|---|---|
| 2008/0311949 A1* | 12/2008 | Koskinen et al. | 455/525 |
| 2009/0110132 A1 | 4/2009 | Kondrad et al. | |
| 2010/0315988 A1* | 12/2010 | Chen | 370/312 |
| 2011/0026464 A1* | 2/2011 | Chen et al. | 370/328 |
| 2011/0093569 A1* | 4/2011 | Yamagishi | 709/219 |
| 2011/0141963 A1* | 6/2011 | Lim | 370/312 |
| 2011/0205952 A1 | 8/2011 | Gou et al. | |
| 2012/0147807 A1* | 6/2012 | Wang et al. | 370/312 |
| 2013/0007287 A1* | 1/2013 | Chu et al. | 709/227 |

FOREIGN PATENT DOCUMENTS

KR 10-2009-0048507 5/2009

* cited by examiner

*Primary Examiner* — Jamal Javaid
*Assistant Examiner* — Wali Butt
(74) *Attorney, Agent, or Firm* — Nelson Mullins Riley & Scarborough LLP

(57) ABSTRACT

There is provided a method for synchronization between one or more base stations to provide broadcast multicast service, including: receiving a session start request message, and extracting a service start setting time set to start broadcast service from the session start request message; comparing the service start setting time to a modification check time being a check time which is later than and closest to the service start setting time, among check times at which it is determined whether or not broadcast service has changed, the check times having a predetermined time interval; deciding, when the modification check time is later than the service start setting time by a predetermined internal slack time period or more, the modification check time as a service start time at which broadcast service starts; and transmitting information indicating the service start time to the base stations.

13 Claims, 7 Drawing Sheets

SYNCHRONIZATION METHOD AND APPARATUS FOR BROADCAST MULTICAST SERVICE

CLAIM FOR PRIORITY

This application claims priority to Korean Patent Application No. 10-2012-0031520 filed on Mar. 28, 2012 in the Korean Intellectual Property Office (KIPO), the entire contents of which are hereby incorporated by reference.

BACKGROUND

1. Technical Field

An example embodiment of the present invention relates in general to synchronization between base stations, and more particularly, to a method and apparatus for synchronization between base stations to provide broadcast multicast service in a multi-cell environment.

2. Related Art

A Long Term Evolution (LTE) mobile communication system is a packet-based mobile communication network and a next-generation communication system evolved to provide various high-speed data services. The LTE system defines a Multimedia Broadcast and Multicast Service (MBMS) based on a Multimedia Broadcast multicast service Single Frequency Network (MBSFN) in order to provide broadcast services through a wireless communication network.

In order to provide broadcast service based on the MBSFN, all base stations belonging to the corresponding service region should transmit the same information to a plurality of terminals simultaneously. For synchronized transmission, the base stations have to use the same scheduling algorithm and receive packets with the same content from the upper node before a radio transmission period starts. Also, for synchronized transmission of information, all the base stations need to be synchronized. A region in which all base stations are synchronized is defined as a MBSFN synchronized area. Also, a group of cells providing the same service, among base stations (cells) belonging to such a MBSFN synchronized area, can be defined as a MBSFN area.

For synchronized transmission of information, the base stations belonging to the MBSFN area have to receive the same scheduling information from a Multi-Cell/Multicast Coordinate Entity (MCE). A Broadcast Multicast Service Center (BM-SC) provides information using a SYNC protocol for synchronized transmission. The SYNC protocol has time stamps and packet serial numbers as additional information that is used to check scheduling times and packet loss.

Specifically, a control message for starting new broadcast service is generated by the BM-SC and transmitted to the MCE via a MBMS Gateway (MBMS-GW) and a Mobility Management Entity (MME). The MCE allocates radio resources to the new broadcast service, decides a service order based on priority, and notifies the corresponding base stations of the start of the broadcast service. Accordingly, the BM-SC which distributes broadcast contents transmits service packets for the corresponding broadcast service to the base stations, and the base stations receive the service packets and transmit them to a wireless sections.

Also, base stations belonging to a MBSFN synchronized area and MCEs controlling the base stations are accurately synchronized in hardware using a GPS or another methods so that the base stations can transmit synchronized data to the wireless sections.

As described above, although conventional synchronized base stations are configured to enable synchronized transmission using a SYNC protocol in a BM-SC, there is a problem that when the BM-SC transmits service packets for a broadcast at an arbitrary time in accordance with the start of the broadcast service, inconsistency in broadcast service time may occur. In other words, when the BM-SC transmits service packets to base stations at an arbitrary time, the service packets may reach the base stations at different times, that is, transmission delays of the service packets are generated due to different networks established between the base stations and differences in performance of intermediate routers configured between the base stations. Transmission delays cannot be avoided even when the SYNC protocol is used Also, when it is the start of broadcast service, a service operator can designate an absolute start time of the broadcast service to base stations belonging to a MBSFN region through a management message or the like. However, such a static control method makes it difficult to properly reflect the dynamic characteristics of broadcast services, and there are also difficulties in the actual implementation.

SUMMARY

Accordingly, example embodiments of the present invention are provided to substantially obviate one or more problems due to limitations and disadvantages of the related art.

An example embodiment of the present invention provides a method for dynamically resolving a broadcast service start time inconsistency problem in which broadcast services between base stations start at different times which may generate when broadcast service starts.

Another example embodiment of the present invention also provides an apparatus for dynamically resolving a broadcast service start time inconsistency problem in which broadcast services between base stations start at different times which may generate when broadcast service starts.

In one example embodiment, there is provided a method for synchronization between one or more base stations to provide broadcast multicast service, including: receiving a session start request message, and extracting a service start setting time set to start broadcast service from the session start request message; comparing the service start setting time to a modification check time being a check time which is later than and closest to the service start setting time, among check times at which it is determined whether or not broadcast service has changed, the check times having a predetermined time interval (called a modification period); deciding, when the modification check time is later than the service start setting time by a predetermined internal slack time or more, the modification check time as a service start time at which broadcast service starts; and transmitting information indicating the service start time to the base stations.

The extracting of the service start setting time may include deciding, when the service start setting time which is a time set to start broadcast service is not extracted from the session start request message, a time at which the session start request message is received, as the service start setting time.

The synchronization method which in the deciding of the modification check time as the service start time, may include deciding time elapsed from the modification check time by a modification period, as the service start time when the modification check time is not later than the service start setting time by the predetermined internal slack time or more.

The synchronization method may further include deciding a time that is earlier than the service start time by the internal slack time period, as a new service start time.

In another example embodiment, there is provided a method in which at least one base station provides broadcast multicast service, including: receiving a session start request message and information indicating a service start time; requesting an upper router to send a user packet for providing broadcast service corresponding to the session start request message; and receiving the user packet and transmitting the user packet to at least one user equipment so as to start broadcast service at the service start time.

The service start time in which a service start setting time being a time set to start broadcast service is extracted from the session start request message, may include a modification check time being a check time that is later than and closest to the service start setting time, among check times at which it is determined whether or not broadcast service has changed is compared to the service start setting time, the check times having a predetermined time interval, and when the modification check time is later than the service start setting time by a predetermined internal slack time period or more, the modification check time is decided as a service start time at which broadcast service starts, and when the modification check time is not later than the service start setting time by the predetermined internal slack time period or more, time elapsed from the modification check time by a modification period is decided as the service start time.

In another example embodiment, there is provided a synchronization apparatus for broadcast multicast service, the synchronization apparatus controlling scheduling of at least one base station, including: a receiver configured to receive a session start request message, and to extract a service start setting time set to start broadcast service from the session start request message; a calculator configured to compare the service start setting time to a modification check time being a check time which is later than and closest to the service start setting time, among check times at which it is determined whether or not broadcast service has changed, the check times having a predetermined time interval, and to decide, when the modification check time is later than the service start setting time by a predetermined internal slack time period or more, the modification check time as a service start time at which broadcast service starts; and a communication unit configured to transmit information indicating the service start time to the base station.

When the modification check time is not later than the service start setting time by the predetermined internal slack time period or more, the calculator may decide time elapsed from the modification check time by a modification period, as the service start time.

The calculator may decide a time that is earlier than the service start time by the predetermined internal slack time period, as a new service start time.

In another example embodiment, there is provided a base station for providing a broadcast multicast service, including: a message receiver configured to receive a session start request message and information indicating a service start time from a Multi-Cell/Multicast Coordinate Entity (MCE); a broadcast service requesting unit configured to request a Multimedia Broadcast Multicast Service-Gateway (MBMS-GW) to send a user packet in order to provide broadcast service corresponding to the session start request message; and a radio resource allocating unit configured to receive the user packet and to transmit the user packet to at least one user equipment so as to start broadcast service at the service start time.

Therefore, by using the synchronization method and apparatus according to the embodiments described above, base stations can achieve synchronized transmission of information for broadcast service.

Accordingly, it is possible to overcome a time inconsistency problem in which base stations start providing broadcast service at different times.

BRIEF DESCRIPTION OF DRAWINGS

Example embodiments of the present invention will become more apparent by describing in detail example embodiments of the present invention with reference to the accompanying drawings, in which.

DESCRIPTION OF EXAMPLE EMBODIMENTS

Figure 1:
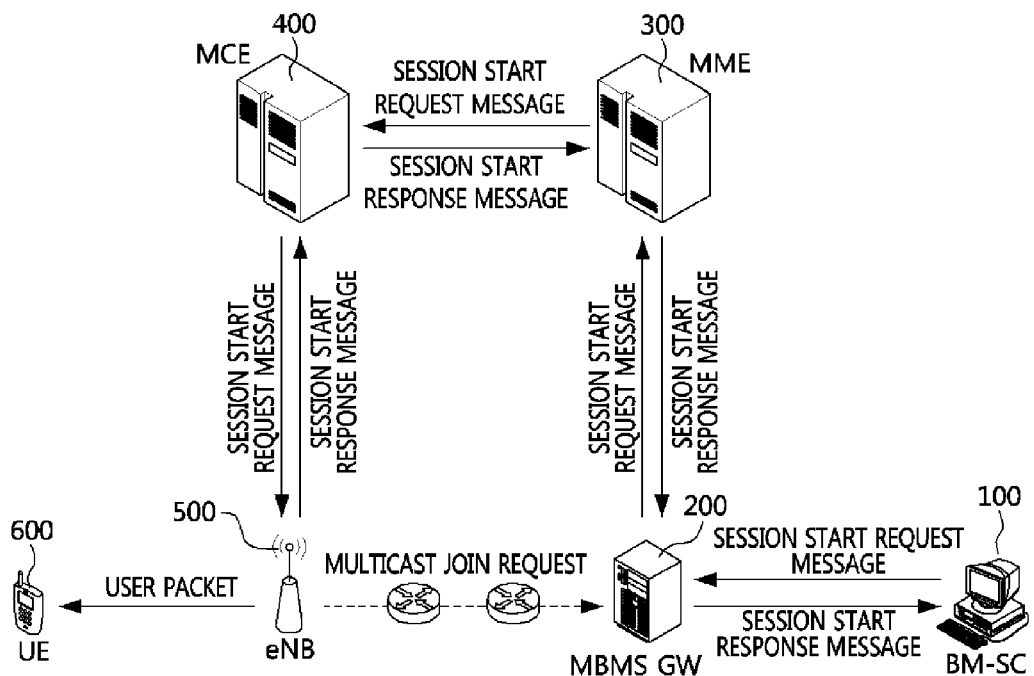
FIG. 1 is a conceptual view describing a flow of messages for time consistency for enabling base stations to simultaneously start providing broadcast service.

Example embodiments of the present invention are described below in sufficient detail to enable those of ordinary skill in the art to embody and practice the present invention. It is important to understand that the present invention may be embodied in many alternate forms and should not be construed as limited to the example embodiments set forth herein.

Accordingly, while the invention can be modified in various ways and take on various alternative forms, specific embodiments thereof are shown in the drawings and described in detail below as examples. There is no intent to limit the invention to the particular forms disclosed. On the contrary, the invention is to cover all modifications, equivalents, and alternatives falling within the spirit and scope of the appended claims. Elements of the example embodiments are consistently denoted by the same reference numerals throughout the drawings and detailed.

It will be understood that, although the terms first, second, A, B, etc. may be used herein in reference to elements of the invention, such elements should not be construed as limited by these terms. For example, a first element could be termed a second element, and a second element could be termed a first element, without departing from the scope of the present invention. Herein, the term "and/or" includes any and all combinations of one or more referents.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements. Other words used to describe relationships between elements should be interpreted in a like fashion (i.e., "between" versus "directly between," "adjacent" versus "directly adjacent," etc.).

The terminology used herein to describe embodiments of the invention is not intended to limit the scope of the invention. The articles "a," "an," and "the" are singular in that they have a single referent, however the use of the singular form in the present document should not preclude the presence of more than one referent. In other words, elements of the invention referred to in the singular may number one or more, unless the context clearly indicates otherwise. It will be further understood that the terms "comprises," "comprising," "includes," and/or "including," when used herein, specify the presence of stated features, items, steps, operations, elements, and/or components, but do not preclude the presence or addition of one or more other features, items, steps, operations, elements, components, and/or groups thereof.

The term "User Equipment (UE)" used in this specification may be referred to as a mobile station, a user terminal (UT), a wireless terminal, an Access Terminal (AT), a terminal, a subscriber unit, a Subscriber Unit (SU), a Subscriber Station (SS), a wireless device, a wireless communication device, a Wireless Transmit/Receive Unit (WTRU), mobile node, a mobile, or other words. The UE may be a cellular phone, a smart phone having a wireless communication function, a Personal Digital Assistant (PDA) having a wireless communication function, a wireless modem, a portable computer having a wireless communication function, a photographing device such as a digital camera having a wireless communication function, a gaming device having a wireless communication function, a music storing and playing appliance having a wireless communication function, an Internet home appliance capable of wireless Internet access and browsing, or also a portable unit or terminal having a combination of such functions. However, the UE is not limited to the above-mentioned units.

Also, the term "base station" used in this specification may be referred to as another word, such as a base station, Node-B, eNode-B, a basetransceiver system (BTS), an access point, etc.

Unless otherwise defined, all terms (including technical and scientific terms) used herein are to be interpreted as is customary in the art to which this invention belongs. It will be further understood that terms in common usage should also be interpreted as is customary in the relevant art and not in an idealized or overly formal sense unless expressly so defined herein.

Hereinafter, embodiments of the present invention will be described in detail with reference to the appended drawings.

FIG. 1 is a conceptual view describing a flow of messages for time consistency for enabling base stations to simultaneously start providing broadcast service.

Referring to FIG. 1, a Multimedia Broadcast multicast service Single Frequency Network (MBSFN) includes a Broadcast Multicast Service Center (BM-SC) 100, a Multimedia Broadcast Multicast Service Gateway (MBMS-GW) 200, a Mobility Management Entity (MME) 300, a Multi-Cell/Multicast Coordinate Entity (MCE) 400, an eNB 500, and UE 600.

The BM-SC 100 may authorize MBMS bearer services, start to provide the MBMS bearer services, and transmit scheduling information and data in consideration of Quality of Service (QoS) according to broadcast data (that is, MBMS packets) used to MBMS. For example, the BM-SC 100 may transmit broadcast content stored therein to a LTE network, or connect to an external content server to relay broadcast content. Here, the MBMS packets are data including broadcast content, control messages, etc.

Also, the BM-SC 100 may define a SYNC protocol that provides synchronization information (SYNC information) related to scheduling of the eNB 500 in order to achieve synchronized transmission of user packets in wireless section. The SYNC protocol functions to transfer information regarding the time stamps and serial numbers of packets, the total number of transmitted octets, etc., which are used to decide relative times at which the corresponding MBMS packets that are transmitted from the BM-SC 100 to the eNB 500 have to be transmitted in wireless section. The eNB 500 may receive the information through the SYNC protocol and perform synchronized scheduling of the user packets including broadcast content.

The MBMS-GW 200 functions to relay messages between the BM-SC 100 and the eNB 500. A control message provided by the BM-SC 100 is transmitted to the eNB 500 via the MBMS-GW 200 through a GTP-U tunnel (GPRS Core Network). Also, an IP network is established between the BM-SC 100 and eNBs (500 for each), and there may be provided a plurality of routers between the BM-SC 100 and the MBMS-GW 200, and between the MBMS-GW 200 and the eNBs 500. That is, the MBMS-GW 200 may control MBMS sessions, and transmit user packets including broadcast content to each eNB 500 using an IP multicast transfer method.

The MME 300 manages transmission of control messages between the MBMS-GW 200 and the MCE 400. The control messages refer to information which is used to control provision of a broadcast service, such as starting or terminating broadcast service, and may include a session start request message for requesting the start of a new broadcast service. That is, the MME 300 is in charge of control of MBMS sessions, and may have the MCE 400 and a M3 interface to connect the MCE 400 to the MBMS-GW 200.

The MCE 400 may control one or more eNBs (500 for each) based on a control message received from the MME 300. The MCE 400 may allocate the same scheduling information to at least one of the eNBs 500, and achieve clock synchronization with the eNBs 500 in hardware. That is, the MCE 400 is in charge of management and allocation of radio resources with respect to eNBs 500 belonging to the MCE 400, and controls acceptance of MBMS.

The eNBs 500 receive information about radio resources allocated by the MCE 400, and perform synchronized transmission of user packets in order to provide broadcast service scheduled by the MCE 400.

Hereinafter, a flow of control messages for starting broadcast service will be described in more detail with reference to FIG. 1.

If a new broadcast service is started by the BM-SC 100, the BM-SC 100 transmits a session start request message for requesting the start of the new broadcast service to the MBMS-GW 200. The MBMS-GW 200 that has received the session start request message provides a session start response message to the BM-SC 100 in response to the session start request message.

Then, the MBMS-GW 200 transmits the received session start request message to the MME 300, the MME 300 that has received the session start request message transmits the received session start request message to the MCE 400, and the MCE 400 that has received the session start request message provides a session start response message to the MME 300 in response to the session start request message. The MME 300 transfers the received session start response message to the MBMS-GW 200.

The MCE 400 allocates radio resources based on the received session start request message, and may set priority according to the characteristics of the broadcast service. Also, the MCE 400 transmits the received session start request message to the eNB 500, and the eNB 500 that has received the session start request message provides a session start response message to the MCE 400 in response to the session start request message. Also, if a list of broadcast services changes due to the newly added broadcast service, the MCE 400 may transmit a scheduling information message to the eNB 500 in order to notify the fact that a list of broadcast services has changed, and the eNB 500 may provide a scheduling information response message to the MCE 400 in response to the scheduling information message.

Then, the eNB 500 sends a multicast join request to the upper router in order to receive user packets for the broadcast service corresponding to the received session start request message. If the eNB 500 receives the requested user packets, the eNB 500 may provide the user packets to the UE 600 to thereby provide the broadcast service to the UE 600.

Figure 2:
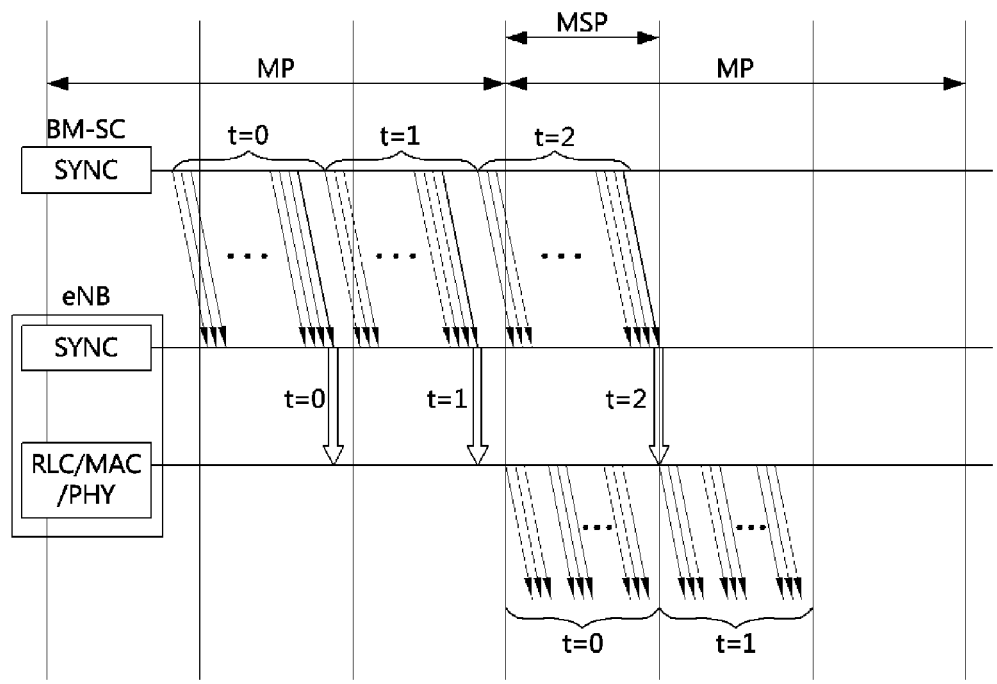
FIG. 2 is a timing diagram describing scheduling for transmission of user packets.

FIG. 2 is a timing diagram describing scheduling for transmission of user packets.

Referring to FIG. 2, when broadcast service starts, a BM-SC 100 transmits user packets to which time stamps have been assigned in unit of a preset time period according to a SYNC protocol of the BM-SC 100, to an eNB 500.

The eNB 500 may collect, instead of independently scheduling the received user packets, user packets having the same time stamp, and simultaneously schedule the collected user packets in a predetermined time unit. The predetermined time unit is referred to as a MCH Scheduling Period (MSP). The MSP is a time period per which a time stamp is assigned, and a predetermined number of MSPs may configure a Modification Period (MP).

Also, the eNB 500 may schedule wireless section for broadcast service in order to match each time at which a MP starts. Here, the MP (modification period time) refers to a period per which modification information (additions, modifications, deletions, etc.) about broadcast services are applied, and the eNB 500 may inform the UE 600 of modification information about broadcast services through a MBMS control channel (MCCH).

That is, modification information about broadcast services may be updated at every MP period, and a MCE 300 has to enable the eNB 500 to transfer modification information about broadcast services to the UE 600 before a MP starts at every MP period.

When broadcast service starts, user packets to which time stamps 0, 1, and 2 have been assigned are transferred to the eNB 500. The BM-SC 100 starts transmitting the user packets to the eNB based on a time designated by an MBMS operator, and a SYNC protocol of the eNB 500 may receive the user packets transmitted from the BM-SC 100, and buffer the user packets until receiving a final control packet (denoted by a bold arrow).

Also, if the SYNC protocol of the eNB 500 receives the final control packet, the SYNC protocol of the eNB 500 may verify the integrity (that is, any loss) of the buffered user packets, and then transmit the corresponding user packets to the lower layer. Here, the lower layer may be a physical layer (PHY), a media access control (MAC), or a radio link control (RLC).

The lower layer that has received the user packets may schedule the corresponding user packets for a MSP period according to the time stamp of the user packets, at a time at which a new MP starts, and then transmit the resultant user packets in wireless section.

Figure 3:
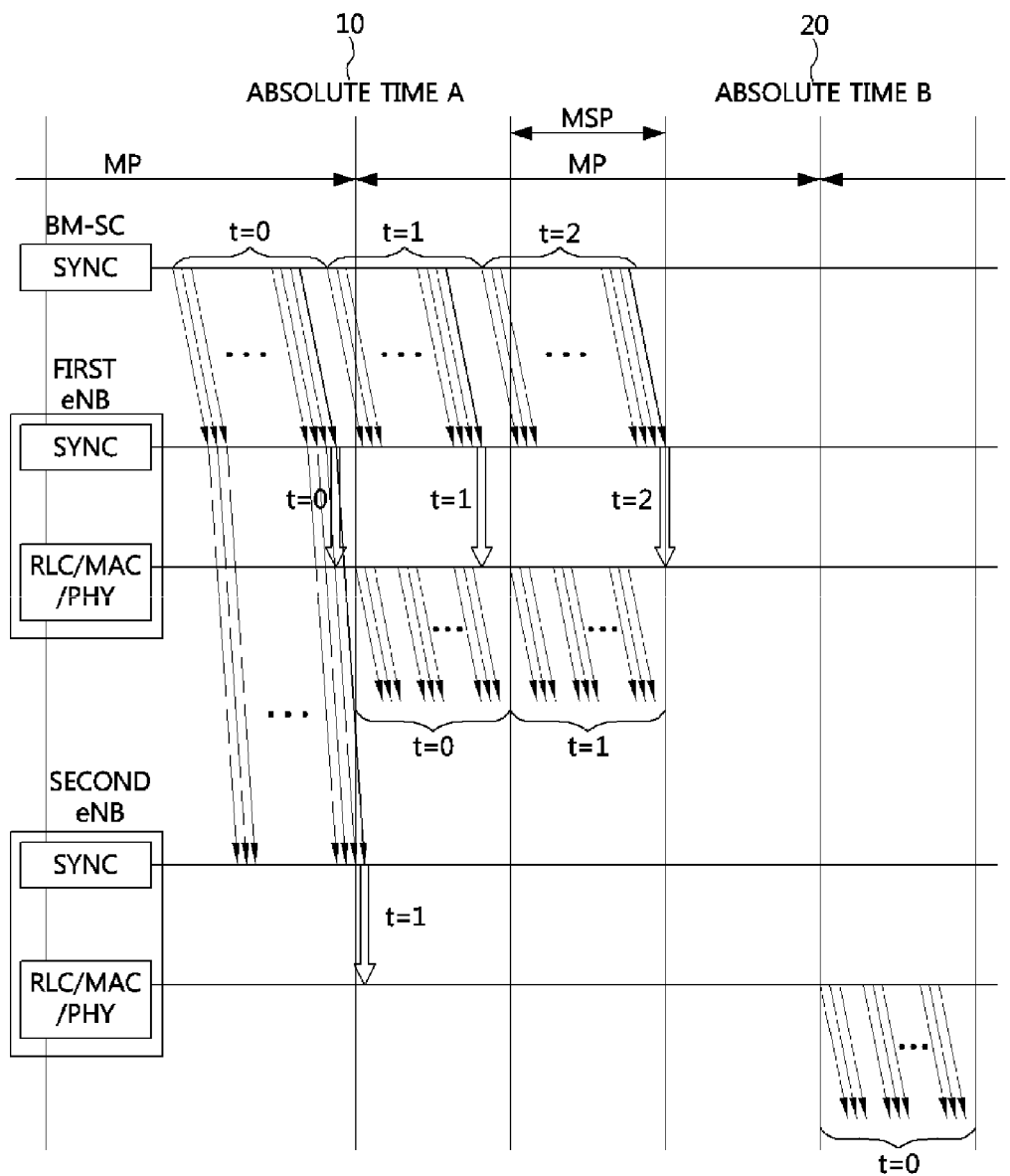
FIG. 3 is a timing diagram describing transmission delays of user packets.

FIG. 3 is a timing diagram describing transmission delays of user packets.

Referring to FIG. 3, user packets provided by a BM-SC 100 are transferred to first and second eNBs 500 in a multicast manner.

In FIG. 3, the user packets provided by the BM-SC 100 are shown as if they are transferred to the first eNB and then to the second eNB. However, in actual implementation, user packets provided by the BM-SC 100 reach the first and second eNBs at different times.

Absolute times can refer to a time at which scheduling start times are set by a MBMS operator. In FIG. 3, at absolute times A and B (10 and 20), scheduling is performed and user packets are transmitted to wireless section.

In regard of user packets received by the first eNB, control packets included in user packets having a time stamp 0 are received by the first eNB before the absolute time A (10). Accordingly, at the absolute time A (10), the corresponding user packets can be scheduled and start being transmitted in wireless section.

However, in regard of user packets received by the second eNB, the control packets included in the user packets having the time stamp 0 are received by the second eNB after the absolute time A (10). Accordingly, at the absolute time B (20) which is the next absolute time of the absolute time A (10), the corresponding user packets can be scheduled and start being transmitted in wireless section. That is, a transmission delay may occur at the second eNB.

Accordingly, the first and second eNBs perform scheduling at different times so as to start or resume broadcast service at different times.

Figure 4:
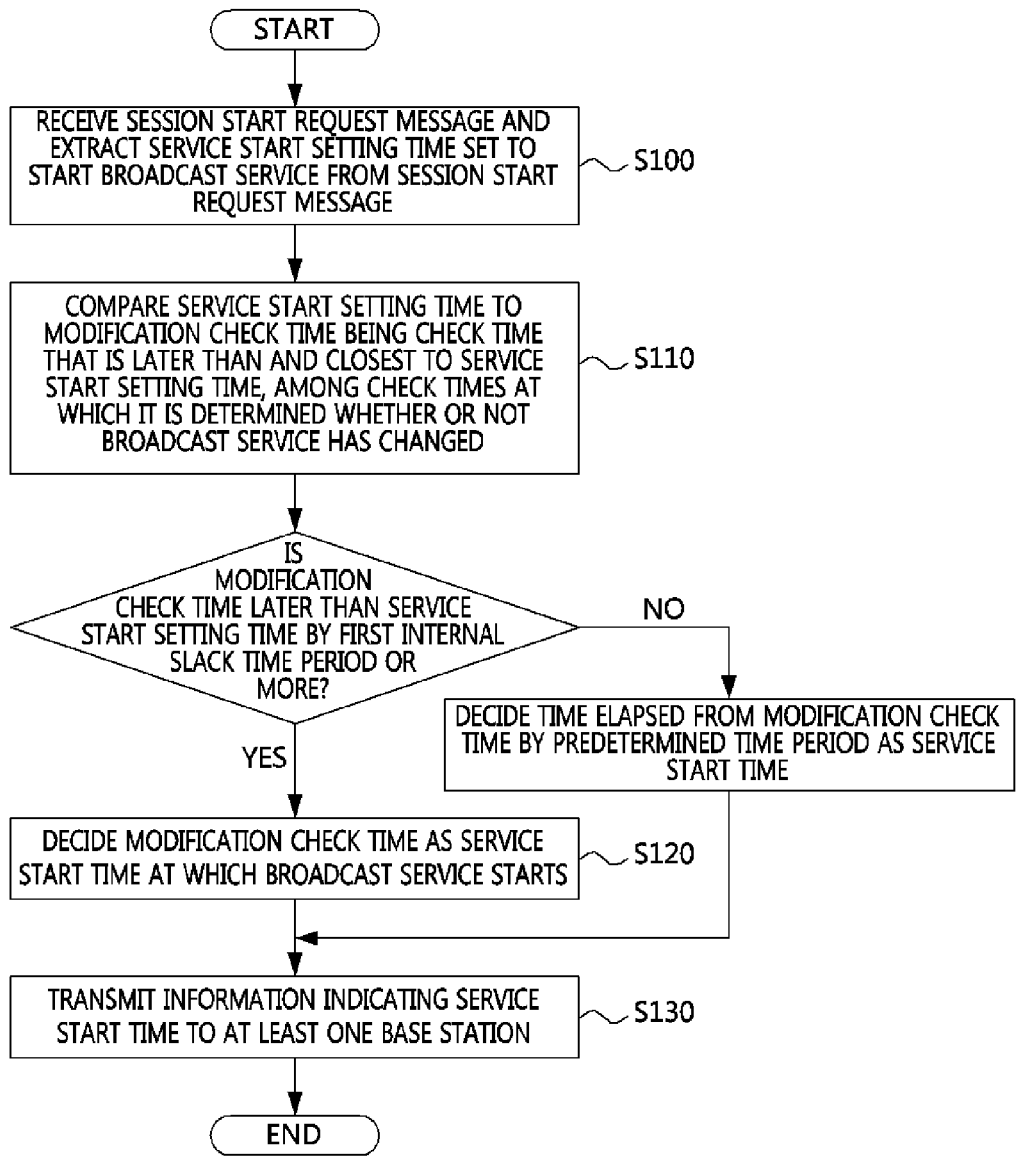
FIG. 4 is a flowchart illustrating an example of a method for synchronization between base stations to simultaneously start providing broadcast service according to an exemplary embodiment of the present invention.

FIG. 4 is a flowchart illustrating an example of a method for synchronization between base stations to simultaneously start providing broadcast service.

Referring to FIGS. 1 and 4, an example of a synchronization method which is performed by an apparatus for controlling scheduling of at least one base station will be described below. Here, the apparatus for controlling scheduling of at least one base station may be a MCE for MBMS.

The synchronization method for MBMS includes operation S100 of receiving a session start request message and extracting a service start setting time set to start broadcast service from the session start request message, operation S110 of comparing the service start setting time to a modification check time being a check time which is later than and closest to the service start setting time, among check times at which it is determined whether or not broadcast service has changed, the check times having a predetermined time interval (called MP), operation S120 of deciding, if the modification check time is later than the service start setting time by a first internal slack time period or more, the modification check time as a service start time at which broadcast service starts, and operation S130 of transmitting information indicating the service start time to at least one base station.

In operation S100, the session start request message is information for notifying the start of broadcast service, and is used to control the start of a MBMS session. Referring to FIG. 1, a control message provided by the BM-SC 100 may be transmitted to the eNB 500 via the MBMS-GW 200 through a GTP-C tunnel, and the control message may include a session start request message. Accordingly, the session start request message may be transferred to the MCE 400 along the same path as that along which the control message is transmitted. That is, the MCE 400 may receive the session start request message from the MME 300.

Also, the session start request message includes information indicating the service start setting time set to start the broadcast service. Accordingly, the service start setting time may be extracted from the session start request message. Here, the service start setting time is information indicating when the broadcast service starts, and may be an absolute time transferred from the BM-SC 100.

In operation S100, if no service start setting time can be extracted from the session start request message, a time at which the session start request message is received may be decided as a service start setting time. In other words, if the session start request message includes no information regarding a service start setting time, the time at which the MCE 400 receives the session start request message from the MME 300 can be used as a service start setting time.

Then, in operation S110, each check time at which it is determined whether or not broadcast service has changed may be a time at which a MP starts. Accordingly, the predetermined time interval may correspond to a MP. Also, the check time which is later than and closest to the service start setting time, may be decided as the modification check time, and the modification check time is defined to decide a check time that will be compared to the service start setting time since the check times appear at the predetermined time intervals (MP).

That is, the result of the comparison between the service start setting time transferred from the BM-SC 100, the service start setting time being an absolute time for setting a time at which the broadcast service will start, and the modification check time may be used to decide timing of scheduling.

In operation S120, a case where the modification check time is later than the service start setting time will be first described.

If it is determined in operation S110 that the modification check time is later than the service start setting time by the first internal slack time period or more, the modification check time is decided as the service start time at which the broadcast service actually starts. Here, the first internal slack time period may be decided in consideration of a maximum transfer delay when a broadcast data packet provided by the BM-SC 100 is transferred to at least one base station, or a delay when scheduling information is transferred from the MCE 400 to at least one base station.

For example, the first internal slack time period may be a sum of a maximum transfer delay, a delay upon processing a control message, and a delay upon transmission of information from the MCE 400 to at least one base station, wherein the delay upon processing the control message may be a time period taken for the MCE 400 to process the control message.

In operation S130, information indicating the service start time decided in operation S120 may be transferred to one or more eNBs 500. In this way, by using a modification check time as a service start time in consideration of a maximum transfer delay, etc., it is possible to guarantee synchronization of the eNBs 500.

Also, in operation S120, if it is determined that the modification check time is not later than the service start setting time by the first internal slack time or more, time elapsed from the modification check time by the modification period may be decided as the service start time. If the modification check time is earlier than the service start setting time, it is impossible to guarantee synchronization of the eNBs 500 with respect to a broadcast service start time although a maximum transfer delay is considered. Accordingly, in this case, time elapsed from the modification check time by the modification period may be decided as the service start time. That is, since whether or not broadcast service has changed is determined at every predetermined time period (for example, at every MP), it is possible to start broadcast service at the next check time at which whether or not broadcast service has changed is determined.

Figure 5:
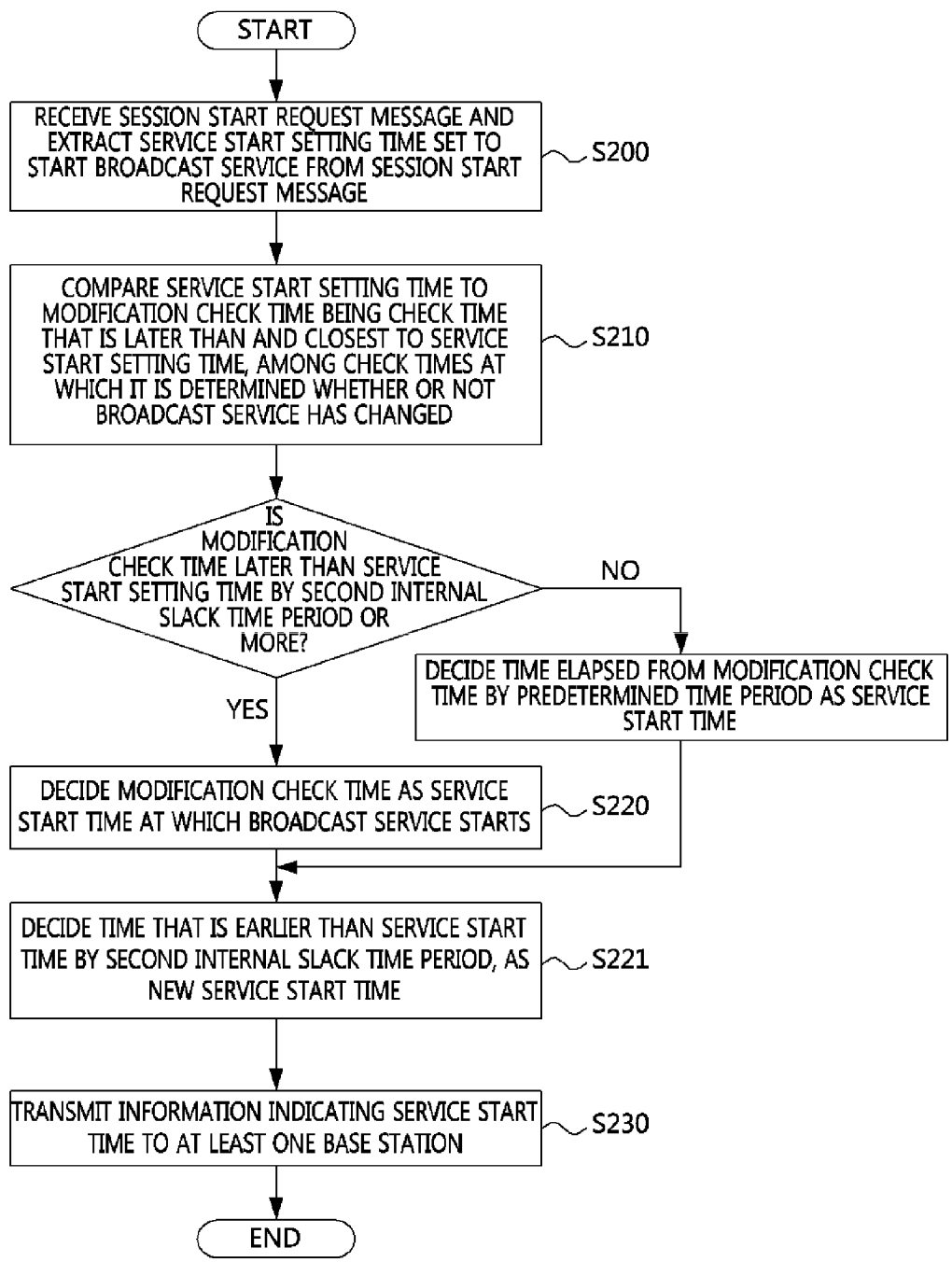
FIG. 5 is a flowchart illustrating another example of a method for synchronization between base stations to simultaneously start providing broadcast service according to another exemplary embodiment of the present invention.

FIG. 5 is a flowchart illustrating another example of a method for synchronization between base stations to simultaneously start providing broadcast service.

Referring to FIGS. 1 and 5, another example of a synchronization method which is performed by the apparatus for controlling scheduling of at least one base station will be described.

The synchronization method includes operation S200 of receiving a session start request message and extracting a service start setting time set to start broadcast service from the session start request message, operation S210 of comparing the service start setting time to a modification check time being a check time which is later than and closest to the service start setting time, among check times at which it is determined whether or not broadcast service has changed, the check times having a predetermined time interval, operation S220 of deciding, if the modification check time is later than the service start setting time by a second internal slack time period or more, the modification check time as a service start time at which broadcast service starts, and operation S230 of transmitting information indicating the service start time to at least one base station.

Since operations S200 and S210 are the same as operations S100 and S110, descriptions about operations S200 and S210 will be omitted.

In operation S220, a case where the modification check time is later than the service start setting time will be described below.

If it is determined in operation S210 that the modification check time is later than the service start setting time by the second internal slack time period or more, the modification check time is decided as the service start time at which the broadcast service actually starts. Here, the second internal slack time period may be decided in consideration of a maximum transfer delay when a broadcast data packet provided by the BM-SC 100 is transferred to at least one base station, or a delay when information is transmitted from the BM-SC 100 to the MCE 400.

For example, the second internal slack time period may be a sum of a maximum transfer delay, a delay upon processing a control message, and a delay upon transmission of information from the BM-SC 100 to the MCE 400, wherein the delay upon processing the control message may be a time period taken for the MCE 400 to process the control message, and may be dozens of ms at a maximum.

In operation S220, if it is determined that the modification check time is not later than the service start setting time by the second internal slack time or more, time elapsed from the modification check time by the modification period may be decided as the service start time. If the modification check time is earlier than the service start setting time, it is impossible to guarantee synchronization of the eNBs 500 with respect to a broadcast service start time although a maximum transfer delay is considered. Accordingly, in this case, time elapsed from the modification check time by the modification period may be decided as the service start time. That is, since whether or not broadcast service has changed is determined at every predetermined time period (for example, at every MP), it is possible to start broadcast service at the next check time at which whether or not broadcast service has changed is determined.

Also, in operation S220, a time that is earlier than the service start time by the modification period may be decided as a new service start time (S221). That is, by deciding a time that is earlier than the service start time decided among the check times by the modification period as a new service start time, the service start setting time which is an absolute time transferred from the BM-SC 100 can be reflected to start the broadcast service.

Accordingly, operation S220 may further include operation S221 of deciding a time that is earlier than the service start time decided in operation S220 by the modification period, as a new service start time.

In operation S230, information indicating the service start time decided in operation S220 may be transmitted to one or more eNBs 500. In this way, by using a modification check time as a service start time in consideration of a maximum transfer delay, etc., it is possible to guarantee synchronization of the eNBs 500. Accordingly, in operation S230, information indicating the service start time decided in operation S220 or the new service start time decided in operation S221 may be provided to one or more eNBs 500.

Figure 6:
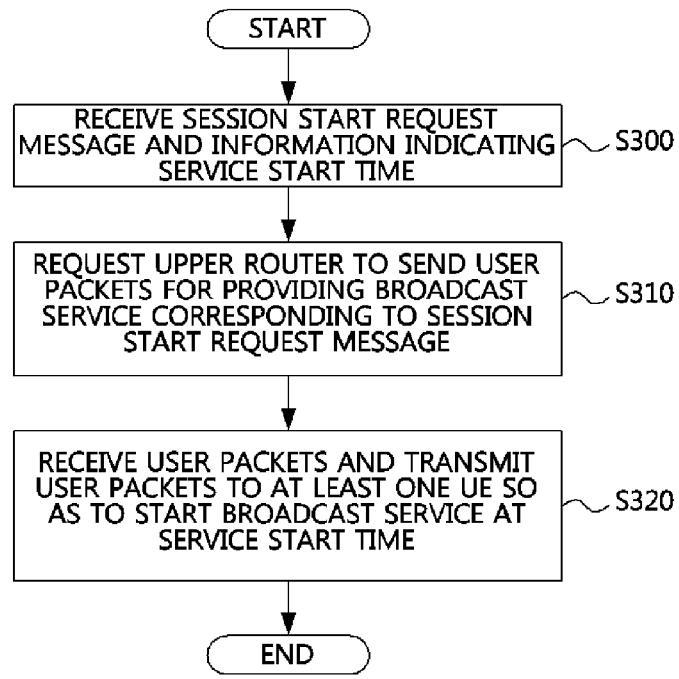
FIG. 6 is a flowchart illustrating an example of a method in which a base station provides broadcast multicast service according to an exemplary embodiment of the present invention.

FIG. 6 is a flowchart illustrating an example of a method in which a base station provides broadcast multicast service.

The method in which the base station provides the broadcast multicast service includes operation S300 of receiving a session start request message and information indicating a service start time, operation S310 of requesting the upper router to send user packets for providing broadcast service corresponding to the session start request message, and operation S320 of receiving the requested user packets and transmitting the received user packets to at least one UE 600 so as to start broadcast service at the service start time.

Referring to FIG. 1, in operation S300, the session start request message may be transferred from the BM-SC 100 to the eNB 500 via the MBMS-GW 200, the MME 300, and the MCE 400. The service start time may be a time at which broadcast service starts, the service start time calculated by the MCE 400 for synchronization of at least one base station.

In operation 310, if the session start request message is received, the eNB 500 may request the upper router to send the user packets so that the broadcast service corresponding to the session start request message can start. That is, the eNB 500 may send a multicast join request to the MBMS-GW 200 through the upper router.

In operation 320, the broadcast service corresponding to the session start request message may be simultaneously started in one or more UEs 600. For this, the eNB 500 may transmit user packets for providing broadcast service corresponding to the session start request message to the UEs 600.

Particularly, in the current example, a service start setting time being a time set to start broadcast service is extracted from a session start request message, a modification check time being a check time that is later than and closest to the service start setting time, among check times at which it is determined whether or not broadcast service has changed, the check times having a predetermined time interval, is compared to the service start setting time, if the modification check time is later than the service start setting time by a predetermined internal slack time period or more, the modification check time is decided as a service start time at which broadcast service starts, and if the modification check time is not later than the service start setting time by a predetermined internal slack time period or more, time elapsed from the modification check time by a modification period is decided as the service start time. Here, the predetermined internal slack time period may be the first or second internal slack time period described above.

Figure 7:
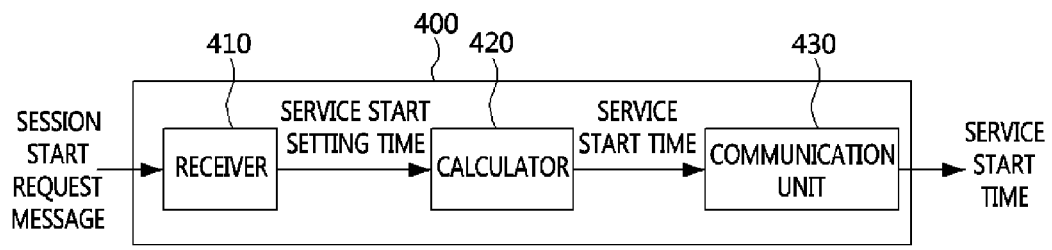
FIG. 7 is a block diagram illustrating an example of a synchronization apparatus for broadcast multicast service according to another exemplary embodiment of the present invention.

FIG. 7 is a block diagram illustrating an example of a synchronization apparatus for broadcast multicast service.

Referring to FIG. 7, the synchronization apparatus controls scheduling of at least one base station, and includes a receiver 410, a calculator 420, and a communication unit 430. Also, the synchronization apparatus may be the MCE 400 (see FIG. 1).

The receiver 410 may receive a session start request message, and extract a service start setting time set to start broadcast service. The session start request message is information for notifying that the broadcast service starts, and is used to control the start of a MBMS session. The session start request message is transferred to the receiver 410 through the MME 300 (see FIG. 1). Also, since the session start request message includes information indicating a service start setting time set to start broadcast service, the receiver 410 may extract the service start setting time from the session start request message.

The calculator 420 may compare the service start setting time which is an absolute time for deciding a time at which broadcast service starts, to a modification check time, to thereby decide timing of scheduling. That is, the calculator 420 may compare the service start setting time to the modification check time being a check time that is later than and closest to the service start setting time among check times at which it is determined whether or not broadcast service has changed, the check times having a predetermined time interval.

If the modification check time is later than the service start setting time by a predetermined internal slack time period or more, the calculator 420 may decide the modification check time as a service start time at which broadcast service starts. Here, the predetermined internal slack time period may be the first or second internal slack time period described above.

Meanwhile, if the modification check time is not later than the service start setting time by the predetermined internal slack time period or more, time elapsed from the modification check time by a modification period may be decided by the calculator 420 as the service start time. That is, since whether or not broadcast service has changed is determined at every predetermined time period (for example, at every MP), it is possible to start broadcast service at the next check time at which whether or not broadcast service has changed is determined, thereby guaranteeing synchronized transmission between base stations in a radio period.

That is, by deciding a time that is earlier than the service start time by the modification period, as a new service start time, the service start setting time which is an absolute time transferred from the BM-SC 100 can be reflected to start broadcast service.

The communication unit 430 may transmit information indicating the service start time to the base stations. In this way, by using a modification check time as a service start time in consideration of a maximum transfer delay, etc., it is possible to guarantee synchronization of the eNBs 500.

Figure 8:
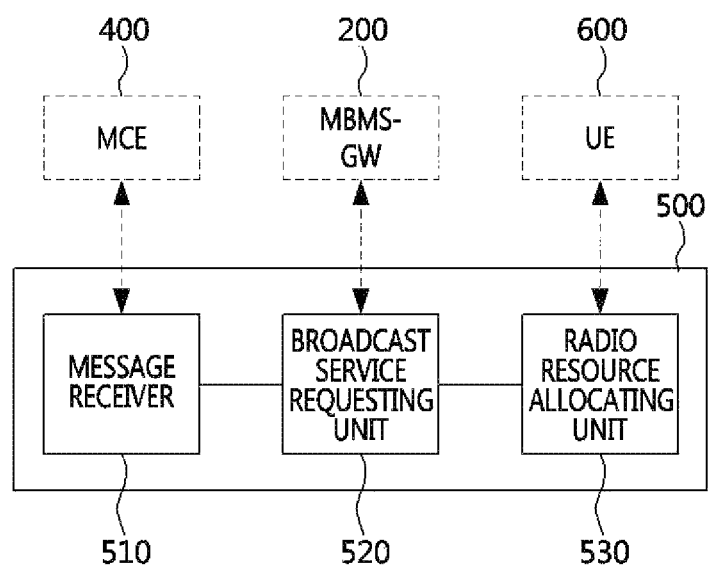
FIG. 8 is a block diagram illustrating an example of a base station for broadcast multicast service according to an exemplary embodiment of the present invention.

FIG. 8 is a block diagram illustrating an example of a base station for broadcast multicast service.

Referring to FIGS. 1 and 8, the base station (for example, the eNB 500) includes a message receiver 510, a broadcast service requesting unit 520, and a radio resource allocating unit 530.

The message receiver 510 may receive a session start request message and information indicating a service start time from the MCE 400.

The broadcast service requesting unit 520 may request the MBMS-GW 200 to send user packets for providing broadcast service corresponding to the session start request message, through the upper router.

The radio resource allocating unit 530 may receive the user packets and transmit the user packets to at least one UE 600 so as to start broadcast service at the service start time.

That is, the base station 500 may enable the broadcast service to start at the service start time provided by the MCE 400. A method of deciding the service start time has been described above.

According to the synchronization method and apparatus for MBMS as described above, it is possible to dynamically resolve a time inconsistency problem in which base stations start providing broadcast service at different times.

While the example embodiments of the present invention and their advantages have been described in detail, it should be understood that various changes, substitutions and alterations may be made herein without departing from the scope of the invention.

What is claimed is:

1. A method for synchronization between one or more base stations to provide broadcast multicast service, comprising:
receiving a session start request message, and extracting a service start setting time set to start broadcast service from the session start request message;
comparing the service start setting time to a modification check time, which is a check time which is later than and closest to the service start setting time, among check times at which it is determined whether or not broadcast service has changed, the check times having a predetermined time interval;
deciding, when the modification check time is later than the service start setting time by a predetermined internal slack time period, the modification check time as a service start time at which broadcast service starts and deciding, when the modification check time is not later than the service start setting time by the predetermined internal slack time period, time elapsed from the modification check time by the modification period as the service start time at which the broadcast service starts; and
transmitting information indicating the service start time to the base stations.

2. The method of claim 1, wherein the extracting of the service start setting time includes deciding, when the service start setting time which is a time set to start broadcast service is not extracted from the session start request message, a time at which the session start request message is received, as the service start setting time.

3. The method of claim 1, being performed by an apparatus for controlling scheduling of the base stations.

4. The method of claim 1, wherein in the deciding of the modification check time as the service start time, deciding time elapsed from the modification check time by a modification period, as the service start time when the modification check time is not later than the service start setting time by the predetermined internal slack time period.

5. The method of claim 1, wherein the session start request message is provided from a Mobility Management Entity (MME).

6. The method of claim 1, wherein the predetermined internal slack time period is decided in consideration of a maximum transfer delay when a broadcast data packet provided by a Broadcast Multicast Service Center (BM-SC) is transferred to the base stations, or a delay when information is transferred from a Multi-Cell/Multicast Coordinate Entity (MCE) to the base stations, the MCE being an apparatus for providing scheduling information to the base stations.

7. The method of claim 1, wherein the predetermined internal slack time period is decided in consideration of a maximum transfer delay when a broadcast data packet provided by a Broadcast Multicast Service Center (BM-SC) is transferred to the base stations, or a delay when information is transferred from the BM-SC to a Multi-Cell/Multicast Coordinate Entity (MCE) being an apparatus for providing scheduling information to the base stations.

8. The method of claim 1, wherein in the deciding of the modification check time as the service start time, deciding a time that is earlier than the service start time by the modification period, as a new service start time.

9. A method in which at least one base station provides broadcast multicast service, comprising:
receiving a session start request message and information indicating a service start time;
requesting an upper router to send a user packet for providing broadcast service corresponding to the session start request message;
comparing a modification check time, which is a check time that is later than and closest to a service start setting time among check times at which it is determined whether or not the broadcast service has changed, to the service start setting time, wherein the check times have a predetermined time interval; and
receiving the user packet and transmitting the user packet to at least one user equipment so as to start broadcast service at the service start time,
wherein the service start time is set with a modification check time among a plurality check time which is later than a previous service start time by a predetermined internal slack time period,
wherein the service start time in which the service start setting time being a time set to start the broadcast service is extracted from the session start request message, and, when the modification check time is later than the service start setting time by a predetermined internal slack time period, the modification check time is decided as a service start time at which broadcast service starts, and when the modification check time is not later than the service start setting time by the predetermined internal slack time period, time elapsed from the modification check time by a modification period is decided as the service start time.

10. A synchronization apparatus for broadcast multicast service, the synchronization apparatus controlling scheduling of at least one base station, comprising:
a receiver configured to receive a session start request message, and to extract a service start setting time set to start broadcast service from the session start request message;
a calculator configured to compare the service start setting time to a modification check time, which is a check time which is later than and closest to the service start setting time, among check times at which it is determined whether or not broadcast service has changed, the check times having a predetermined time interval, and to decide, when the modification check time is later than the service start setting time by a predetermined internal slack time period, the modification check time as a service start time at which broadcast service starts and to decide, when the modification check time is not later than the service start setting time by the predetermined internal slack time period, time elapsed from the modification check time by the modification period as the service start time at which the broadcast service starts; and a communication unit configured to transmit information indicating the service start time to the base station.

11. The synchronization apparatus of claim 10, wherein when the modification check time is not later than the service start setting time by the predetermined internal slack time period, the calculator decides time elapsed from the modification check time by a modification period, as the service start time.

12. The synchronization apparatus of claim 10, wherein the calculator decides a time that is earlier than the service start time by the modification period, as a new service start time.

13. A base station for providing a broadcast multicast service that:

receives a session start request message and information indicating a service start time from a Multi-Cell/Multicast Coordinate Entity (MCE);

requests a Multimedia Broadcast Multicast Service-Gateway (MBMS-GW) to send a user packet in order to provide broadcast service corresponding to the session start request message;

compares a modification check time, which is a check time that is later than and closest to a service start setting time among check times at which it is determined whether or not the broadcast service has changed, to the service start setting time, wherein the check times have a predetermined time interval; and receives the user packet and to transmit the user packet to at least one user equipment so as to start broadcast service at the service start time, wherein the service start time is set with a modification check time among a plurality check time which is later than a previous service start time by a predetermined internal slack time period, wherein the service start time in which the service start setting time being a time set to start the broadcast service is extracted from the session start request message, and, when the modification check time is later than the service start setting time by a predetermined internal slack time period, the modification check time is decided as a service start time at which broadcast service starts, and when the modification check time is not later than the service start setting time by the predetermined internal slack time period, time elapsed from the modification check time by a modification period is decided as the service start time.

* * * * *